United States Patent [19]

Elion

[11] Patent Number: 4,927,856

[45] Date of Patent: May 22, 1990

[54] PRODUCTION OF HYDROCARBONS FROM GEOTHERMAL RESOURCES

[75] Inventor: Glenn R. Elion, Chatham, Mass.

[73] Assignee: International Communication & Energy, division of International Optical Telecommunications, Inc., Hyannis, Mass.

[21] Appl. No.: 327,643

[22] Filed: Mar. 23, 1989

[51] Int. Cl.$^5$ .............................................. C07C 27/06
[52] U.S. Cl. .................................... 518/702; 518/700
[58] Field of Search ................................ 518/702, 700

[56] References Cited

U.S. PATENT DOCUMENTS

| | | | |
|---|---|---|---|
| 4,046,830 | 9/1977 | Kuo | 260/676 R |
| 4,138,442 | 2/1979 | Chang et al. | 260/668 R |
| 4,263,141 | 4/1981 | Moller et al. | 260/450 |
| 4,304,871 | 12/1981 | Brennan et al. | 518/717 |
| 4,348,486 | 9/1982 | Calvin et al. | 518/704 |
| 4,348,487 | 9/1982 | Goldstein et al. | 518/704 |
| 4,374,657 | 2/1983 | Schendel et al. | 62/19 |

*Primary Examiner*—Howard T. Mars
*Attorney, Agent, or Firm*—Townsend and Townsend

[57] ABSTRACT

Electricity generation, hydrogen gas production, and methanol production are combined in an integrated system and process for recovering both energy and chemical values from a geothermal resource. Electricity is generated by turbines run by the heated pressurized gas stream emerging from the resource, and the electricity is then used in an electrolysis unit which converts water, optionally condensed from the resource gas, to hydrogen gas, which is then reacted with the carbon oxides in the resource gas to form methanol. Hydrogen sulfide is removed from the resource gas prior to the methanol synthesis by passing the gas through a scrubber where it is contacted with an aqueous solution which is then regenerated by contact with either oxygen from the electrolysis unit or air, and the regenerated solution, free of the regenerating gas, is recycled to the scrubber, thereby avoiding dilution of the resource gas prior to its use in the methanol synthesis.

13 Claims, 2 Drawing Sheets

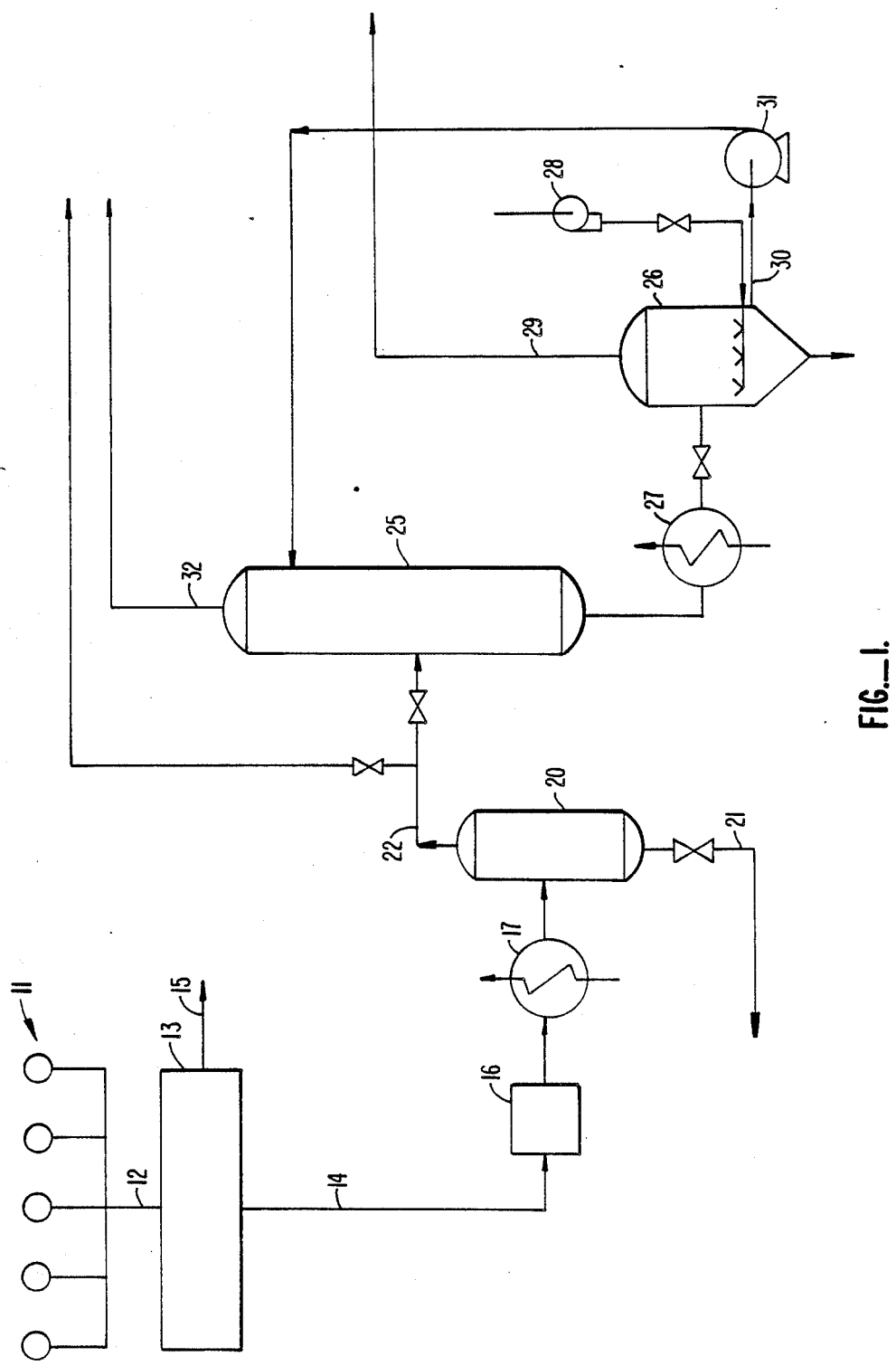
FIG._1.

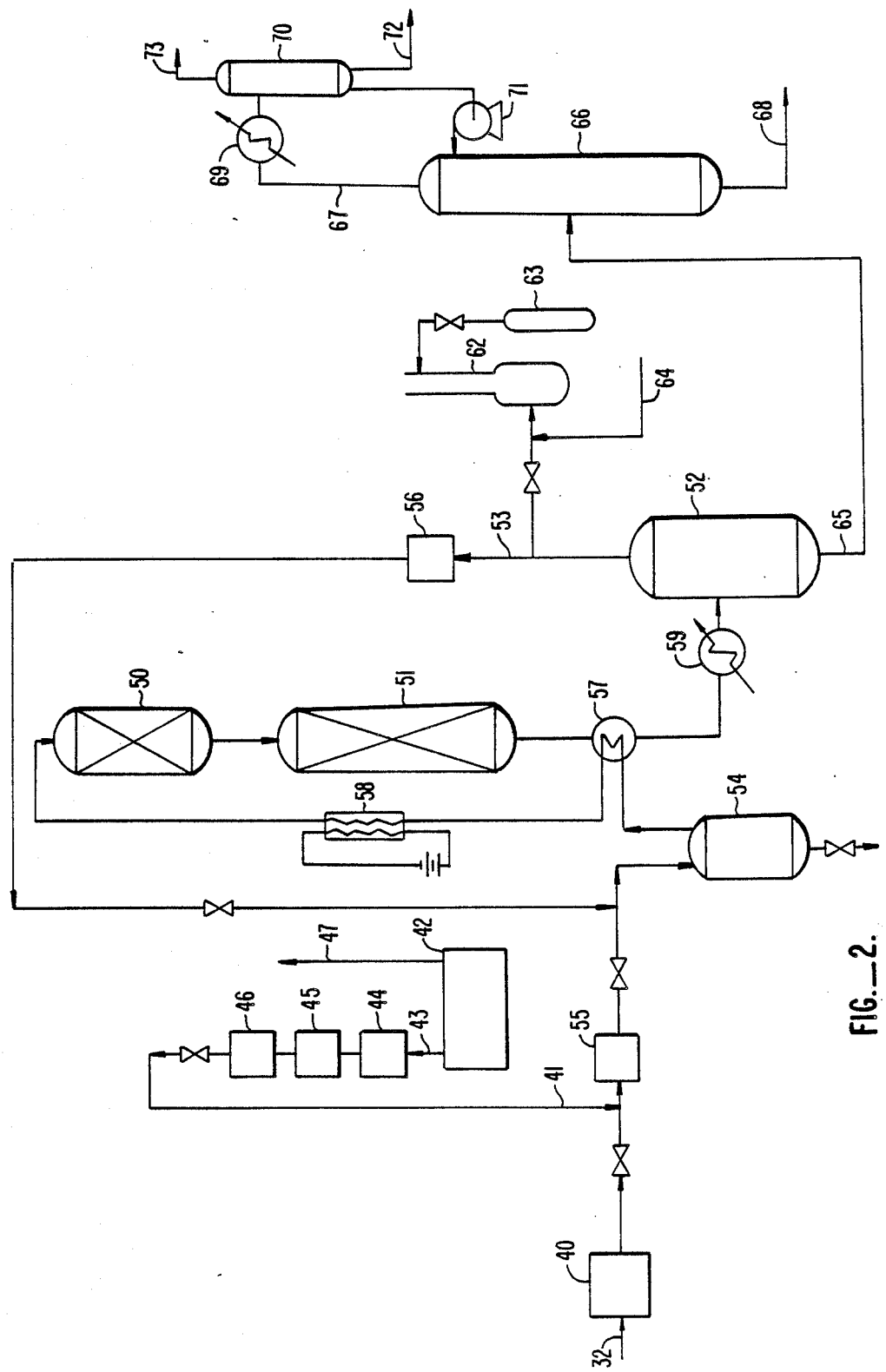
FIG._2.

PRODUCTION OF HYDROCARBONS FROM GEOTHERMAL RESOURCES

This invention relates to geothermal wells and their utilization as a source of energy and hydrocarbon fuels.

BACKGROUND OF THE INVENTION

The production of hydrocarbon fuels generally requires the combination of a variety of resources, both in terms of raw materials and energy. The cost and availability of these resources are always primary considerations in assessing the economics of a fuel-producing process as well as the quality and nature of the fuels thus produced.

A source of energy which has always held promise for these and other processes are geothermal and geopressurized wells. The abundance of hot pressurized gases issuing from these wells offers many opportunities for use, generally as a result of the steam content of the stream, which is used in generating electricity through steam turbines.

The economics of these wells varies with the quality of the issuing stream. The amount of noncondensables varies widely, as does the composition of the noncondensable gases and the temperature and pressure of the resource. For those resources which are high in noncondensables, steam turbines are of limited use due to the low level of condensation occurring across the turbine blades. High-pressure, carbon dioxide dominated wells present environmental problems due to the high levels of excess carbon dioxide being emitted, as well as corrosion problems due to the combined presence of heat, carbon dioxide and hydrogen sulfide. Utilization of the carbon dioxide in hydrocarbon fuel synthesis requires costly hydrogen gas. Hydrogen sulfide removal reduces the efficiency further, since $H_2S$ scrubbers generally introduce air into the system, diluting the carbon dioxide. Due to these and other factors, much of the resource potential of the typical geothermal well is wasted during its use, and many such wells are so plagued by negative economic factors that they are not useful at all. For those wells and reservoirs which can be used, special precautions and system adaptations must be made from one well to the next to achieve optimum utilization of the resource value.

SUMMARY OF THE INVENTION

An integrated system has now been developed for use in drawing both energy and chemical values from geothermal systems. The system combines electrical power generation from the pressurized resource, hydrogen gas production by electrolysis using the electricity generated, and methanol production from the hydrogen gas thus generated and the carbon dioxide content of the resource. Various embodiments of the invention further include hydrogen sulfide removal in a circulating liquid system which avoids the introduction of air or any other gaseous diluents, elemental sulfur recovery, conversion of the methanol to gasoline and other hydrocarbon fuels, and other operations and units which enhance the level of recovery and prolong the life of the process equipment.

The present invention offers the advantage of a high level of utilization of both chemical and energy resources from geothermal wells. The invention further provides a hydrocarbon fuel producing process which is largely if not entirely self-contained in terms of raw material and energy sources. Still further, the invention provides the advantage of adaptability to geothermal wells widely varying in both composition and condition.

Further features and advantages of the invention will be apparent from the description which follows.

BRIEF DESCRIPTION OF THE DRAWINGS

FIGS. 1 and 2 are flow diagrams of two portions respectively of a methanol-producing system, representing one embodiment of a system which may be constructed in accordance with the present invention. The portion shown in FIG. 1 includes the geothermal wells, turbines, and $H_2S$ removal section, while FIG. 2 shows the electrolysis and methanol production units and associated components.

DETAILED DESCRIPTION OF THE INVENTION AND PREFERRED EMBODIMENTS

Any of the variety of existing types of geothermal wells 11 may serve as the resource for the system. These include hydrothermal systems, geopressured basins, and hot dry rock formations. Included are reservoirs which spontaneously produce hot pressurized fluid, and those which require a fluid injection separate well for release of the resource contents. Wells in which the resource is at relatively high pressure such as carbon dioxide dominated wells permit the use of relatively small diameter bore holes, which may be within the range of six inches to twenty inches (15–50 cm). Selection of the number, depth and direction of the wells is governed by the size and location of the resource as well as the placement of the drilling rig on the surface. Typical drilling depths range from 800 to 2500 meters.

The bore hole is capped with a conventional high pressure wellhead containing flow valves and emergency shutoff valves to regulate and control the flow. Streams emerging from the wellhead are generally of flow rates within the range of about 50,000 to about 1,200,000 pounds per hour (22,500 to 544,000 kg/h). Temperatures typically range from about 150° F. to about 550° F. (65°–290° C.), and pressures generally range from about 30 to about 120 psia (2–8 atmospheres) for hydrothermal wells and 120 to 680 psia (8.2–46 atmospheres) for geopressured systems.

As indicated above, the composition of the stream 12 emerging from the well head will vary considerably depending on the nature of the resource. In most cases, this stream will contain (on a weight basis) water at a level of 92% to 99%, carbon dioxide at 0.3% to 8%, hydrogen sulfide at 1 ppm to 35 ppm, hydrogen at 10 ppm to 2900 ppm, methane at 10 ppm to 3200 ppm, ammonia at 1 ppm to 900 ppm, and other noncondensable gases collectively amounting to 10 ppm to 450 ppm.

The resource gas stream passes through an electric generator 13, which may either be a steam turbine or an airdriven type generator, whichever is the most appropriate in view of the condensables content of the resource gas. When an air-type motor is used, it is selected and optimized in accordance with the pressures and temperatures of both the resource gas 12 and the temperatures and pressures most favorable to the downstream unit.

Electricity generated by the electric generator is used to drive the water electrolysis unit (shown in FIG. 2 and discussed below), while the output stream 14 is directed to the other system units for treatment. Any condensate 15 produced in the generator is directed to other wells for reinjection into the ground formation.

The emerging gas stream is passed through a compressor 16 and heat exchanger 17 in which it is cooled to a sufficient degree to condense substantially all water vapor and other condensables present in the stream. A knock-out vessel 20 separates the condensate from the noncondensable gases, the condensate 21 being drawn off for reinjection and the noncondensable gases 22 being drawn off overhead to the hydrogen sulfide abatement section.

The hydrogen sulfide abatement section is comprised of an absorption vessel 25, in which the noncondensable gases are placed in intimate with an aqueous solution which removes the sulfur content from the gases, and a regeneration vessel 26 which converts the sulfur content of the aqueous solution to elemental sulfur and returns the aqueous solution to its original form suitable for further absorption of hydrogen sulfide in the absorber column 25. The absorber column 25 operates by bubbling the gases 22 emerging from the separator 20 through the aqueous solution while drawing the latter off at a controlled rate for regeneration.

The absorption occurring in the absorption vessel 25 may involve conventional technology for $H_2S$ abatement. Thus, any of a wide variety of aqueous systems may be used which are known to convert the $H_2S$ to sulfur in either solid or liquid form. Preferred absorption systems are the Stretford liquid catalyst process using sodium metavanadate, caustic absorption using sodium hydroxide or potassium hydroxide, iron oxide sponges, the Claus process using air, or chemical treatment. Iron compounds are environmentally preferred. Examples of iron compounds which have been found satisfactory are products designated ARI-310 and ARI-311, which are termed "catalytic reagents" and are identified as aqueous solutions of organically caged (chelated) iron which accept electrons from sulfide ions without being altered chemically and are returned to their original state upon exposure to oxygen. These products are available from ARI Technologies Inc., Palatine, Ill. The concentration of the catalytic reagent is not critical, and may vary widely. In most cases, concentrations within the range of about 1000 ppm to about 2000 ppm by weight will provide the best results, a 1500 ppm solution having been used satisfactorily.

The aqueous solution upon leaving the absorber vessel 25 may be cooled by an optional heat exchanger 27 prior to entering the regeneration vessel 26. In the regeneration vessel, regeneration is achieved by bubbling an oxygen-containing gas through the solution. The oxygen-containing gas may be atmospheric air supplied by a blower 28. Alternatively, oxygen generated by the electrolysis section of the process (shown in FIG. 2 and discussed below) may be used. The blower 28 is useful during start-up, or to supplement the oxygen produced by the electrolysis unit.

Excess oxygen and other gaseous components of the oxygen-containing gas leave the regeneration vessel 26 in a stream 29 at the top of the vessel, while solids settle toward the bottom. The solids will generally include sulfur from the hydrogen sulfide as well as salts accumulating in the system. The sulfur may be recovered from these solids by filtering, melting, centrifuging, or other conventional methods well known to those skilled in the art. Selection will in many cases be based on relative costs.

The regenerated aqueous solution leaves the regeneration vessel 26 through a transfer line 30 which draws the solution from the vessel at a point below the level and removed from the settling solids, thereby drawing liquid only. The regenerated solution is directed through a circulation pump 31 to the top of the absorption vessel 25. In this manner, the noncondensable gases (primarily carbon dioxide), from the geothermal well are converted to a hydrogen sulfide-free stream 32 without the introduction of air.

Turning now to FIG. 2, the clean carbon dioxide stream 32 is directed through a compressor 40 toward the section of the system of where conversion to methanol is performed. Adjoining the carbon dioxide stream is a stream of hydrogen gas 41 which is supplied by the water electrolysis unit 42. Electricity to drive the electrolysis unit is taken from the steam turbines 13 (FIG. 1). The water supply may be obtained from any available source. Condensate from the steam turbine 13 may be used, for example, or condensates from any of the various compressors in the system. Undesirable salts may be removed from the water by chemical treatment, by ion exchange resins, or by reverse osmosis. It is preferable to use water of approximately neutral pH, and it is further preferable that the water be distilled, deionized and low in dissolved gases.

Hydrogen 43 leaving the electrolysis unit is passed through compressors 44, which raise the pressure to approximately 700–1200 psia (48–82 atmospheres). The compressed hydrogen gas is passed through an oxygen-removing catalyst 45 to remove any substantial amounts of oxygen from the hydrogen stream, preferably lowering the oxygen content to a level below 10 ppm. Conventional materials such as platinum wire mesh may be used as the catalyst. The hydrogen is then passed through an oil filter 46. The electrolysis unit, compressor, oxygen catalyst and oil filter may be installed as a skid-mounted unit of the type which is available commercially. The oxygen stream 47 may be used as a gaseous feed to the regeneration vessel 26 of FIG. 1, as mentioned above.

The section of the process in which conversion to methanol takes place includes a zinc oxide bed 50, a methanol reactor vessel 51, a methanol separator 52, a recycle line 53 which returns unreacted hydrogen and carbon dioxides to the zinc oxide bed 50 and methanol reactor 51, a surge drum 54, and various compressors 55, 56, pre-heaters 57, 58, and a cooler 59.

The zinc oxide bed is preferably a packed bed of solid zinc oxide pellets. Typical pellets may range in size from about 3/16 inch to 0.25 inch in diameter (0.48–0.64 cm). The quantity of zinc oxide and the contact temperature are selected such that the bed will lower the hydrogen sulfide content of the incoming stream to less than 0.5 ppm. Preferred operating temperatures generally range from 400° F. to 550° F. (204° C. to 288° C.).

The reaction system in the methanol reactor 51 may be any of the various known systems for methanol synthesis from carbon oxides and hydrogen. The reaction medium may be an adiabatic fixed bed, a shell-and-tube arrangement, or a slurry, depending on the system chosen and the conditions of the incoming gases.

An adiabatic fixed bed arrangement is often preferred. The fixed bed is a conventional catalyst for methanol synthesis, which may be mixtures of various metal oxide catalysts reduced with hydrogen prior to use, depending upon the temperature and pressure of the system. Catalysts which minimize operating pressure are preferred. Commercial catalysts are available from Lurgi of Germany, ICI of England, BASF of Germany and Haldor Topsoe of Denmark. Preferred operating conditions are those with pressures ranging from about 35 to about 80 atmospheres and temperatures ranging from about 200° C. to about 260° C. Pressures ranging from about 60 to about 75 atmospheres and temperatures ranging from about 215° C. to about 250° C. are particularly preferred. These conditions are maintained by the compressors 55, 56 and the preheaters 57, 58.

The methanol separator 52 separates the product from the unreacted hydrogen and carbon oxides, the product methanol having been condensed in the cooler 59. As recycling proceeds, light hydrocarbons such as methane present in the vapor phase will accumulate, and must be periodically vented, preferably to a burner or furnace 62 which may be fueled by an outside fuel source 63 such as a propane tank. Vent gases 64 from start-up may also be burned in the same unit. This burner or furnace 62 may also serve as an auxiliary source of heat for the gases entering the zinc oxide bed 50 and methanol reactor 51.

In those cases where ammonia or amines have been produced by the process, or introduced from the geothermal resource, treatment of the methanol mixture prior to distillation may be preferred. Pretreatment is generally done using cation exchange resins to remove both ammonia and amines simultaneously in the liquid phase. Typical commercial resins include Rohm & Haas Amberlite IR-120, Sybron Ionac C-267, and Klenzoid Ionite C-51.

For methanol mixtures containing ammonia and amines, depending on product use, without pretreatment the methanol product may have an odor depending on the ammonia or amine concentration. Methanol/water separation techniques using centrifuges instead of distillation are particularly vulnerable to these types of residual odor problems.

Methanol emerging from the methanol separator 52 is generally in the form of a mixture 65 of methanol and water, from which the methanol is separated by distillation, a conventional water/methanol distillation column 66. Methanol is drawn off as the column overhead 67 whereas water and heavy components 68 are drawn off the bottom. The cold water condenser 69, reflux drum 70, and pump 71 further refine the methanol product 72, leaving a residual overhead gas stream 73 suitable for venting to the atmosphere.

The product methanol may be stored and sold directly as product. Alternatively, the methanol can be converted to gasoline in accordance with conventional technology. A typical methanol conversion process begins by evaporating the methanol and converting a portion of it to dimethyl ether over a zeolite catalyst such as ZSM5. This conversion generally occurs at temperatures ranging from about 400° F. to about 700° F. (204°–371° C.) and a pressure ranging from about 5 to about 500 psia (0.34–34 atmospheres), with a single pass conversion ranging from about 40% to above 70%. The heat evolved by the reaction may be used to preheat the incoming methanol.

Conversion to gasoline may then be done using a conventional zeolite catalyst such as ZSM5 or ZSM11, at temperatures ranging from about 600° F. to about 850° F. (315° C.–464° C.), and pressures ranging from about 5 to about 500 psia (0.34–34 atmospheres). Conversion may be optimized by varying the configuration and arrangement of the catalyst, and in particular by grading the catalyst bed.

Graded beds may be achieved by doping the catalyst with reaction inhibitors such as potassium, sodium or phosphorus oxides in concentrations varying from 0.1 to 5% by dry weight, to varying degrees in separate zones of the reactor. The zones may be arranged radially, axially, or both. As an example, catalyst zones containing higher concentrations of inhibitors may be positioned toward the center of the reactor cross section with the inhibitor level decreasing in directions extending radially outward. Similarly, axially spaced zones may be used with the inhibitor concentration increasing in the direction toward the outlet end of the reactor. Optimal zone arrangements and configurations will depend upon the type of catalyst, type of dopant, reaction temperatures and pressures, and the volumetric flow rates of gases through the reactor. The effects of this gradation will be enhanced control of hot spot temperatures, prolonged useful life of the catalysts, optimization of the product yield and product composition, and increased conversion.

The foregoing is offered primarily for purposes of illustration. It will be readily apparent to those skilled in the art that modifications, variations, substitutions and the like in terms of the stream compositions, operating conditions and component units may be made without departing from the spirit and scope of the invention.

What is claimed is:

1. A method for producing methanol from a gas mixture containing carbon dioxide emerging from a geopressurized resource, said method comprising:
    (a) passing said gas mixture through a turbine to generate electricity;
    (b) hydrolyzing water with electricity so generated to form hydrogen gas and oxygen gas; and
    (c) reacting said hydrogen gas with said carbon dioxide in said gas mixture emerging from said turbine to form methanol.

2. A method in accordance with claim 1 further comprising contacting said gas mixture emerging from said turbine with an aqueous solution of a member selected from the group consisting of caustic, sodium metavanadate and chelated iron prior to step (c) to remove hydrogen sulfide therefrom.

3. A method in accordance with claim 1 further comprising performing the following steps prior to step (c):
    (i) contacting said gas mixture emerging from said turbine with an aqueous solution of a reagent selected from the group consisting of caustic, sodium metavanadate and chelated iron to convert any hydrogen sulfide in said gas mixture to a product selected from the group consisting of elemental sulfur and insoluble sulfur compounds;
    (ii) contacting said aqueous solution with said product dispersed therein with an oxygen-containing gas to convert any insoluble sulfur compounds therein back to said reagent and solid sulfur; and
    (iii) separating said aqueous solution from said solid sulfur and recycling said aqueous solution thus separated to step (i).

4. A method in accordance with claim 3 in which said oxygen-containing gas of step (ii) is comprised at least in part of oxygen generated in step (b).

5. A method in accordance with claim 3 in which said oxygen-containing gas of step (ii) consists of oxygen generated in step (b).

6. A method in accordance with claim 3 in which said reagent of step (i) is a chelated iron compound.

7. A method in accordance with claim 3 in which step (ii) comprises passing said aqueous solution through a vessel shaped to retain said aqueous solution as a liquid body below a liquid surface and to cause solids therein to settle, and introducing said oxygen-containing gas below said liquid surface; and step (iii) comprises drawing said aqueous solution from said vessel at a location below said liquid surface substantially free of gas and solids, and recycling said aqueous solution to step (i) without introduction therein of gas.

8. A method in accordance with claim 1 further comprising performing the following steps prior to step (c):
 (i) contacting said gas mixture emerging from said turbine with an aqueous solution of an iron chelate capable of accepting electrons from sulfide ions;
 (ii) contacting said aqueous solution, subsequent to contact with said gas mixture, with oxygen generated in step (b) in a vessel shaped to define a liquid level and to permit solids therein to settle, to render said iron chelate capable of accepting further electrons; and
 (iii) drawing said aqueous solution from said vessel below said liquid level and recycling said aqueous solution free of solids and gas to step (i) without introduction of air.

9. A method in accordance with claim 1 in which step (c) is performed in an adiabatic fixed-bed catalytic reactor.

10. A method in accordance with claim 1 in which step (c) is performed in a catalytic reactor at a pressure of from about 25 to about 250 atmospheres and a temperature of from about 200° C. to about 300° C.

11. A method in accordance with claim 1 in which step (c) is performed in an adiabatic fixed-bed catalytic reactor at a pressure of from about 35 to about 80 atmospheres and a temperature of from about 215° C. to about 250° C.

12. A method in accordance with claim 1 in which said water of step (b) is of pH approximately 7.0, distilled and deionized.

13. A method in accordance with claim 1 in which said water of step (b) is comprised at least in part of water condensed from said gas mixture emerging from said geopressured resource.

* * * * *